Jan. 6, 1942.  W. L. KAUFFMAN, 2D  2,268,829

WRINGER

Filed March 22, 1938  2 Sheets-Sheet 1

INVENTOR.
Walter L. Kauffman II
BY
ATTORNEYS.

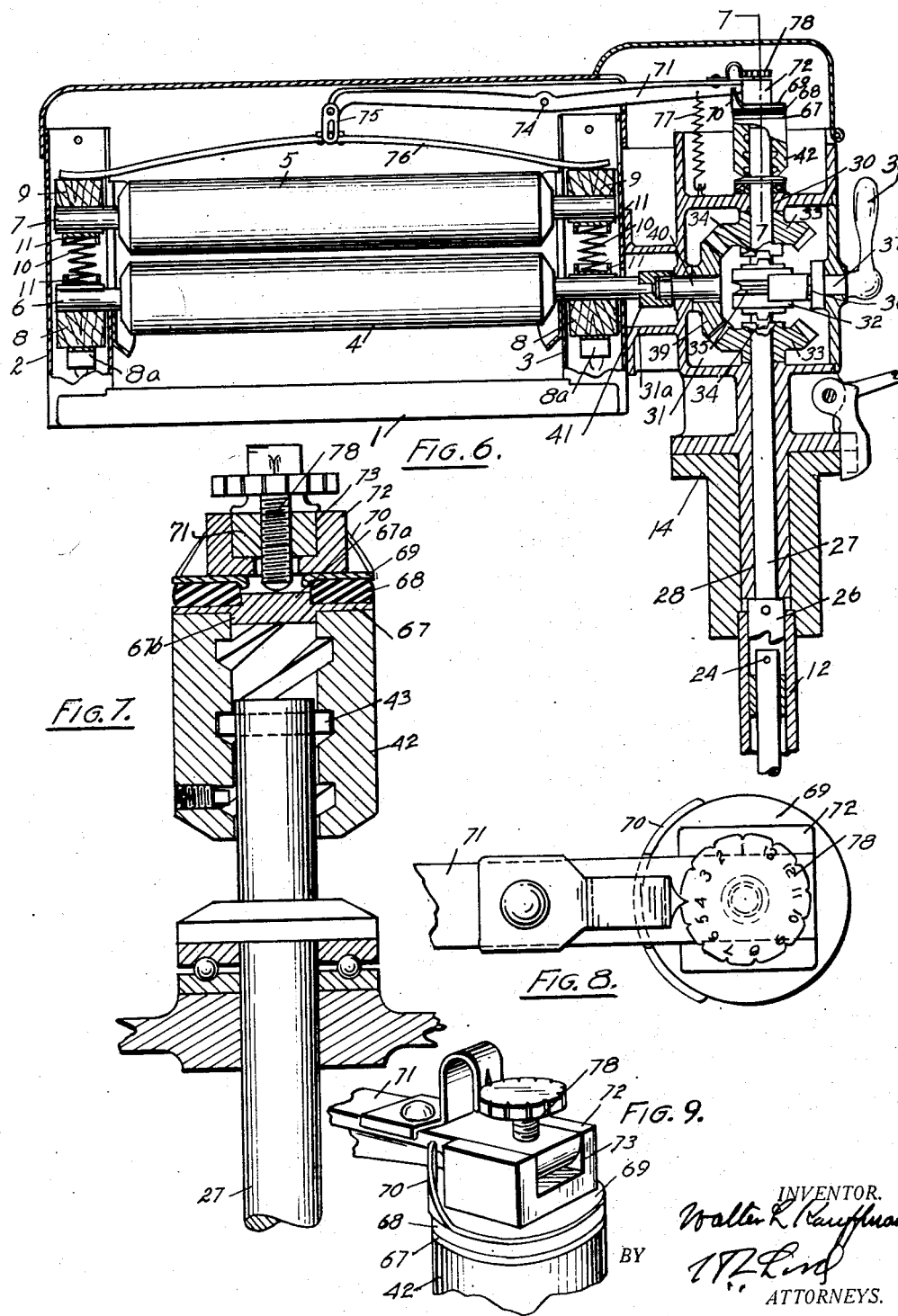

Patented Jan. 6, 1942

2,268,829

UNITED STATES PATENT OFFICE 2,268,829

WRINGER

Walter L. Kauffman, II, Erie, Pa., assignor to Lovell Manufacturing Company, Erie, Pa., a corporation of Pennsylvania Application March 22, 1938, Serial No. 197,387

12 Claims. (Cl. 68—258)

The present invention is designed to give a more definite control to the pressure exerted on the power wringer rolls. The more common method of exerting pressure on rolls has involved a spring or springs which could be for various pressures and which ordinarily increased in pressure as the wringer rolls were opened. The present invention in a general way substitutes a frictional power actuated mechanism for the spring or adds it to the spring so that there may be a more uniform pressure exerted which may be adjusted as desired and which will automatically release with the stopping of the power. In carrying forward the invention the pressure from the friction device is delivered to the rolls to an equalizer so that the rolls can yield to variations in pressures along the length of the roll.

The invention contemplates also a remote control of the driving mechanism and consequently the pressure exerting means. The invention also contemplates an improvement in the friction control pressure exerting mechanism whereby it may be more readily controlled and placed with relation to the rolls so as to maintain its friction surfaces in a uniform condition. Further features and details of the invention will appear from the specification and claims.

Figure 1:
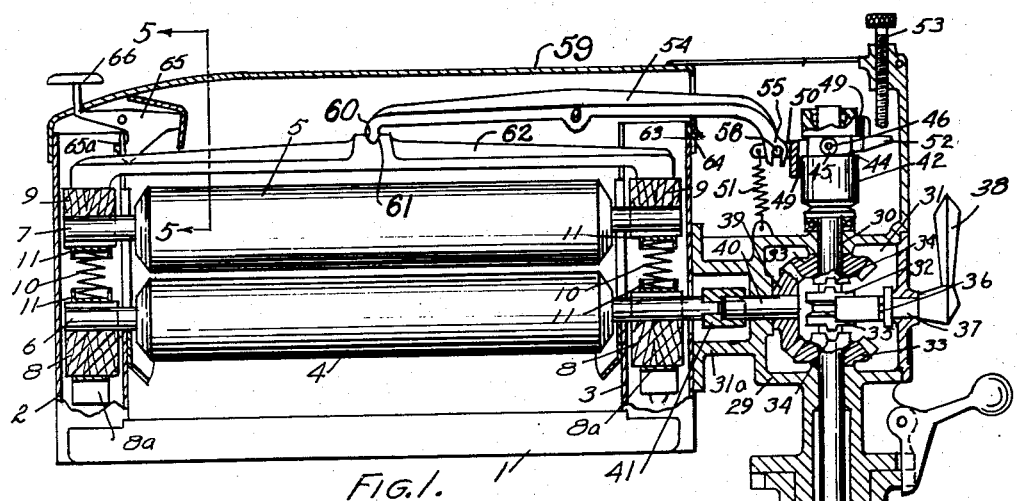

A preferred embodiment of the invention is illustrated in the accompanying drawings as follows:

Fig. 1 shows a central longitudinal section of the wringer.

Figure 2:
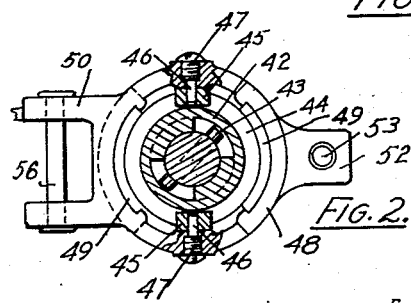
Figure 3:
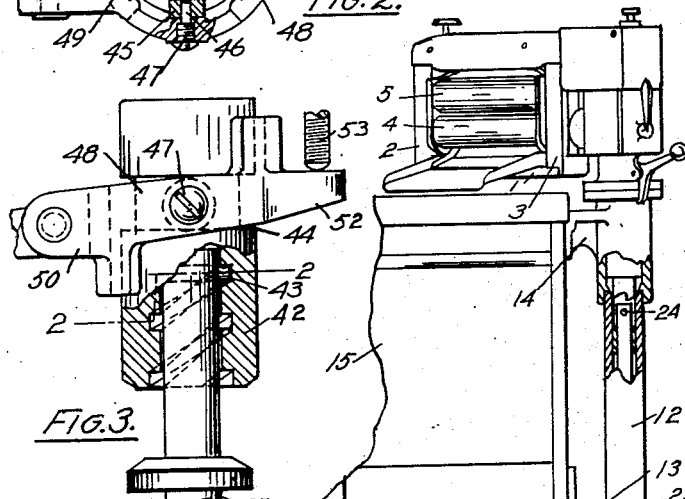

Fig. 2 a section on the line 2—2 in Fig. 3.

Fig. 3 a front elevation of the friction device partly in section.

Figure 4:
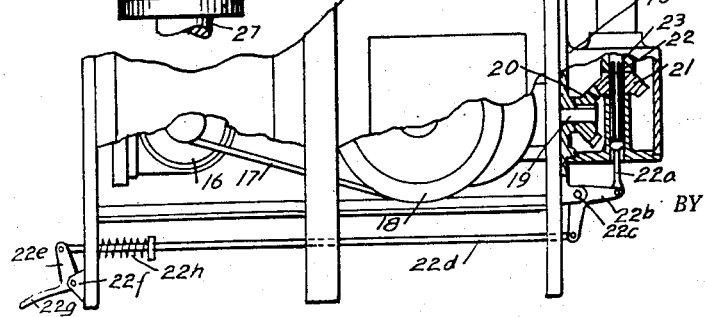

Fig. 4 a view of a washing machine with a wringer attached illustrating the driving control.

Figure 5:
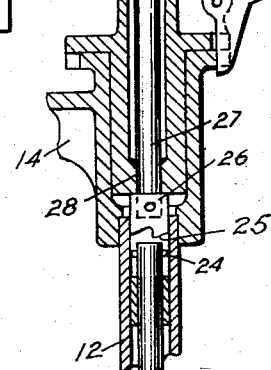

Fig. 5 a section on the line 5—5 in Fig. 1.

Fig. 6 a central section of the wringer showing a modification of the device.

Fig. 7 an enlarged vertical section of the friction device on the line 7—7 in Fig. 6.

Fig. 8 an enlarged plan view of the friction adjusting mechanism.

Fig. 9 a perspective view of the same mechanism.

1 marks the base of the wringer frame, 2 a stile opposite the drive mechanism, 3 a stile next to the driving mechanism, 4 and 5 wringer rolls provided with shafts 6 and 7 respectively, 8 bearings for the shaft 6, the bearings being mounted in the stile and resting on stops 8a arranged in the stile, 9 bearings for the upper shaft 7, these bearings being slidingly mounted in the stile. Springs 10 are arranged between the bearings 8 and 9, the springs being provided with caps 11 bridging the bearing slots in the bearings 8 and 9. These springs tend to open the shafts.

The wringer is carried by a post 12 which is mounted in brackets 13 and 14 extending from a washing machine 15. The power for the washing machine and wringer is supplied by electric motor 16 mounted in the base of the washing machine. This motor drives a belt 17, which belt in turn drives a gear mechanism 18 from which extends a shaft driven through the gear mechanism 19. Bevel gears 20 are fixed on the shaft 19 which drives a bevel gear 21 splined on the shaft 22. The shaft 22 is arranged in bearings 23 in the post 12. The upper end of the shaft 22 is provided with a cross clutch pin 24 which is adapted to engage in a detent 25 in a clutch member 26. The clutch member 26 is fixed on a shaft 27, this shaft being journaled in bearings 28 in a head 29 and extends through bearing 30 in a case 31 formed on the head. The case has a bracket 31a which is secured to the stile 3. A clutch member 32 having clutch jaws is adapted to engage clutch detents 34 in bevel gears 33. The clutch member has a groove 35 which is engaged by crank 36 carried by a shaft 37. A handle 38 is provided for the shaft 37 by means of which the clutch member may be shifted to engage the driving mechanism, the shift as to one gear driving in one direction and the opposite gear in the opposite direction in the usual manner. A bevel gear 39 meshes with the gears 33. It is fixed on a shaft 40 which is connected through a universal joint 41 with the shaft 6.

A push pin 22a is arranged under the shaft 22. It is carried by an arm of a bell crank lever 22b, pivoted on a bracket 22c on the frame of the washer. A rod 22d extends from the lower end of the bell crank lever 22b to a bell crank lever 22e pivoted on a bracket 22f on the frame. One arm of the bell crank lever extends outwardly forming the pedal 22g. A spring 22h normally elevates the push pin 22a and consequently the shaft and holds the driving clutch 24—26 in engagement so that the driving mechanism is normally set. By depressing the pedal the operator can instantly disengage the clutch 24—26 and thus stop the driving mechanism.

The pressure mechanism is as follows: A nut 42 is arranged on the shaft 27. It has a quick thread in which operates a pin 43 on the shaft 27. The nut is yieldingly held against rotation so that with the driving of the shaft 27 in a predetermined direction the pin tends to lift the nut. The nut is provided with a groove 44 in which operate rollers 45, these rollers being journaled on trunnions 46. The trunnions extend from screws 47 arranged in a friction ring 48. The friction ring is provided with friction pads 49 which are adapted to engage the side walls of the nut when the ring is tilted. A forked arm 50 extends from the ring 48. A spring 51 is secured to the arm and the head and exerts initial yielding tilting pressure on the ring 48 so as to exert an initial frictional engagement between the pads 49 and the walls of the nut 42. An arm 52 extends from the opposite side of the ring. A screw 53 is in the path of the arm 52 and engages it at the desired upper maximum lift of the nut. The screw affords an adjustment controlling the maximum initial pressure exerted by the nut.

A lever 54 which has a forked end 55 which engages a pin 56 in the forked arm 50. The lever 54 is pivoted on a pin 58 extending across the wringer top 59. The inner end of the lever has a bearing point 60 engaging in a notch 61 in an equalizing bar 62, the bar resting on the opposite bearings 9.

The operation of the pressure device is as follows: As the rotation of the shaft 27 starts, the frictional engagement of the pads 49 through the action of the spring 51 retards the nut 42 sufficiently to start a lifting action of the nut through the operation of the pin 43 on the screw threads. Immediately with the lifting of the nut, pressure is put on the lever 54 and this pressure operates through the forked arm 50 so as to exert greater tilting action on the ring 48. This exerts a frictional resistance through the pads 49 on the nut so that with a continued movement of the shaft the nut is elevated exerting initial pressure on the rolls and this continues until the arm 52 engages the screw 53, when continued movement of the lifting of the nut tilts the ring 48 so as to relieve pressure on the pads. As soon as the friction is released sufficiently to bring the lifting effect of the screw into balance, the nut turns and no added pressure is delivered to the lever 54. When clothes are introduced to the rolls, thus separating the rolls, the lifting of the inner end of the lever moves the outer end of the lever downwardly and forces the nut downwardly against the lifting action of the screw and the friction. The pitch of the threads of the screw are such that this return movement and consequent reversal of movement of the nut will add only the desired added lifting pressure to the outer end of the lever. Thus the nut is yieldingly forced upwardly through the retarding effect of the friction, but the pitch is such that it will move downwardly when sufficient pressure is exerted. In other words, the nut tends to climb all the time but yields to an opening of the rolls but during this yielding maintains its pressure all the time. The continued pressure of the screw assures a continued pressure on the rolls as the clothes permit of a return movement of the rolls into closer relation. Thus the pressure on the clothes may be readily adjusted so that with a separation of the rolls the increase in pressure over the initial pressure on the rolls may be adjusted as desired.

By varying the lever relation of the lever 54 and the arm 50 the frictional engagement of the pads 49 may be changed as desired and this frictional engagement transmitted into resistance of movement by the screw fixes the pressure which is transmitted through the action of the screw to the lever 54 and consequently to the rolls.

Should the operator become caught in the rolls the driving connection between the shafts 22 and 27 may be broken at the clutch 24—26 by depressing the pedal 22g. Immediately upon breaking this connection the nut is retracted through the back pressure of the lever 54 and consequently releases the pressure on the rolls, and the rolls are separated through the action of the springs 10. At the same time this stops the driving action of the gears so that the operator can readily withdraw the hand from the rolls. Thus a safety device is afforded both as to pressure and as to the driving of the rolls and this safety may be accomplished through a foot lever or control means set at a point remote from the wringer.

The pressure may be also instantly released by releasing the top bar 59. The top bar is arranged telescopically over the side stiles, and shoulders 63 struck up on the stile at 64 on the top bar detachably lock one end of the top bar on a stile. At the opposite end of the top bar a latch 65 is pivotally secured on the top bar and engages a notch 65a in the stile. The latch is provided with a handle 66. By depressing the handle the outer end of the top bar is released and swings upwardly which in turn will disengage the shoulders 63 and 64 and permit a free upward movement of the top bar.

In the modification shown in Figs. 6 to 9 the same wringer frame and wringer roll arrangement is provided, the same wringer mounting and gear arrangement also provided, and the same clutch mechanism and controls are used. The manner of controlling the friction is changed and the pressure is delivered through a spring equalizer instead of a rigid member as shown in Fig. 1.

In this construction a washer 67 is arranged on the top of the nut. It has a projection 67b extending into the nut and an upward projection 67a. The projection 67b locks the washer or plate 67 with the nut. A friction disc 68 is arranged above the washer 67. A plate 69 rests on the friction disc. The plate 69 has an upwardly extending head 70 which engages a lever 71. A pressure head 72 rests on the plate 69. This head is slotted at 73 and the end of the lever 71 extends into this slot and rests on the head. The lever is pivoted by a pin 74 on the wringer top. The inner end of the lever 71 engages a bracket 75 arranged centrally on a spring 76. The ends of the spring rest on the upper bearings 9. The initial pressure is delivered through a spring 77 which is secured to the lever 71 and to the head.

With this initial pressure exerted through the friction disc 68 the nut is retarded and as it starts to move upwardly through the action of the screw the pressure of the spring 76 is exerted through the friction disc. The friction is so balanced with relation to the thrust of the screw that with a predetermined or desired compression of the spring further upward movement ceases with a given pressure. In order that this may be nicely accomplished a screw 78 extends through the end of the lever 71 and the bearing block 72 into engagement with the projection 67a on the plate 67, thus limiting the pressure effect of the lever on the friction washer 68 and in consequence reducing the retarding effect of the washer 68 on the nut, and this in turn reduces the lifting power or pressure exerting power of the nut. When the driving connection is broken the pressure on the lever immediately retracts the nut and pressure is relieved on the rolls and the separation is assisted by reason of the springs 10.

What I claim as new is:

1. In a power wringer the combination of a frame; rolls mounted in the frame; a pressure device for the rolls operated from a central position through an equalizer on both ends of the rolls; a pressure setting device; and a power means operating on the setting device to exert pressure on the pressure device, holding the setting device during the operation of the power means and releasing the pressure with the stopping of the power means.

2. In a power wringer the combination of a frame; rolls mounted in the frame; a pressure device for the rolls; a setting device for the pressure device comprising a screw mechanism; a power means; a yielding friction connection between the power means and the screw mechanism actuating the screw mechanism to energize the setting device; and a stop means releasing the friction at a predetermined initial pressure on the rolls.

3. In a power wringer the combination of a frame; rolls mounted in the frame; a pressure device for the rolls; a setting device for the pressure device comprising a screw mechanism; a power means; a yielding friction connection between the power means and the screw mechanism actuating the screw mechanism to energize the setting device, the screw pitch of the mechanism permitting the retracting of the screw mechanism to release the pressure with the release of power; and means releasing the power having an actuating member adjacent the floor level.

4. In a wringer, the combination of a frame; rolls mounted in the frame; expansively telescopic screw mechanism; means to rotate one part of said screw mechanism, the other part of said screw mechanism being restrained from rotative movement by friction means operatively associated with the frame, the thread of the screw mechanism being arranged and adapted so that relative rotative movement of the parts of the screw mechanism results in expansive telescopic movement; devices to utilize the expansive movement to cause a relative approach of the rolls; and devices responsive to a pre-determined expansion of the screw mechanism to control the said friction means whereby the screw mechanism may rotate as a unit to prevent further expansion.

5. In a power wringer or the like, the combination of a frame; rolls mounted in the frame; a pressure device for the rolls operating from a central position through an equalizer on both ends of the rolls; a pressure setting device; a power means energizing the setting device to exert pressure on the pressure device; and a yielding friction controlling means controlling the setting action of the power device on the setting device.

6. In a power wringer or the like, the combination of a frame; rolls mounted in the frame; a pressure device for the rolls operating from a central position through an equalizer on both ends of the rolls; a pressure setting device; a power means energizing the setting device to exert pressure on the pressure device, said power means releasing the pressure through the setting device with the stopping of the power means; and a yielding friction controlling means controlling the setting action of the power device on the setting device.

7. In a power wringer or the like, the combination of a frame; rolls mounted in the frame; a pressure device for the rolls; a setting device for the pressure device comprising a screw mechanism actuating the setting device through the operation of the screw mechanism; a power means actuating the screw mechanism; and a yielding friction controlling means controlling the action of the screw mechanism to control the energizing of the setting means.

8. In a power wringer or the like, the combination of a frame; rolls mounted in the frame; a pressure device for the rolls; a setting device for the pressure device comprising a screw mechanism actuating the setting device through the operation of the screw mechanism; a power means actuating the screw mechanism, permitting a return movement of the screw mechanism; and a yielding friction controlling means controlling the action of the screw mechanism to control the energizing of the setting means, the pitch of the screw mechanism permitting the retraction of the screw mechanism to release the pressure with the release of power.

9. In a power wringer or the like, the combination of a frame; rolls mounted in the frame; a pressure device for the rolls; a setting device for the pressure device comprising a screw mechanism actuating the setting device through the operation of the screw mechanism; a power means actuating the screw mechanism; a yielding friction controlling means controlling the action of the screw mechanism to control the energizing of the setting means; and means adjusting the friction device to control the screw thrust at the desired pressure.

10. In a power wringer or the like, the combination of a frame; rolls mounted in the frame; a pressure device for the rolls comprising a spring; a setting device for the pressure device comprising a screw mechanism actuating the setting device through the operation of the screw mechanism; a power means actuating the screw mechanism; and a yielding friction controlling means controlling the action of the screw mechanism to control the energizing of the setting means.

11. In a power wringer or the like, the combination of a frame; rolls mounted in the frame; a pressure device for the rolls comprising an equalizing member receiving its pressure intermediate its ends; a setting device for the pressure device comprising a screw mechanism actuating the setting device through the operation of the screw mechanism; a power means actuating the screw mechanism; and a yielding friction controlling means controlling the action of the screw mechanism to control the energizing of the setting means.

12. In a power wringer or the like, the combination of a frame; rolls mounted in the frame; a pressure device for the rolls comprising an equalizing member in the form of a spring receiving its pressure intermediate its ends; a setting device for the pressure device comprising a screw mechanism actuating the setting device through the operation of the screw mechanism; a power means actuating the screw mechanism; and a yielding friction controlling means controlling the action of the screw mechanism to control the energizing of the setting means.

WALTER L. KAUFFMAN, II.